United States Patent [19]

Ishizaka et al.

[11] Patent Number: 5,343,392
[45] Date of Patent: Aug. 30, 1994

[54] METHOD OF DIAGNOSING POWER STEERING SYSTEM

[75] Inventors: Kouichi Ishizaka; Yoshio Asami, both of Higashimatsuyama, Japan

[73] Assignee: Jidosha Kiki Co., Ltd., Tokyo, Japan

[21] Appl. No.: 110,816

[22] Filed: Aug. 23, 1993

Related U.S. Application Data

[63] Continuation of Ser. No. 911,254, Jul. 7, 1992, abandoned, which is a continuation of Ser. No. 538,190, Jun. 14, 1990, abandoned.

[30] Foreign Application Priority Data

Jun. 28, 1989 [JP] Japan .................. 1-163684

[51] Int. Cl.⁵ .............................................. B62D 5/00
[52] U.S. Cl. ........................... 364/424.03; 364/424.05; 180/79.1; 180/142
[58] Field of Search ............ 364/424.03, 424.04, 364/424.05; 180/79.1, 132, 140–143; 340/438, 459, 465; 307/10.1, 10.7

[56] References Cited

U.S. PATENT DOCUMENTS 4,786,866  11/1988  Yabe et al. .................. 364/424.05
4,961,144  10/1990  Yabe et al. .................. 364/424.05

Primary Examiner—Gary Chin
Attorney, Agent, or Firm—Blakely, Sokoloff, Taylor & Zafman

[57] ABSTRACT

In a method of diagnosing a power steering system, in a self-diagnosis mode, changes in steering force are diagnosed by setting the pressure of a reactive steering force chamber in accordance with an engine speed.

4 Claims, 5 Drawing Sheets

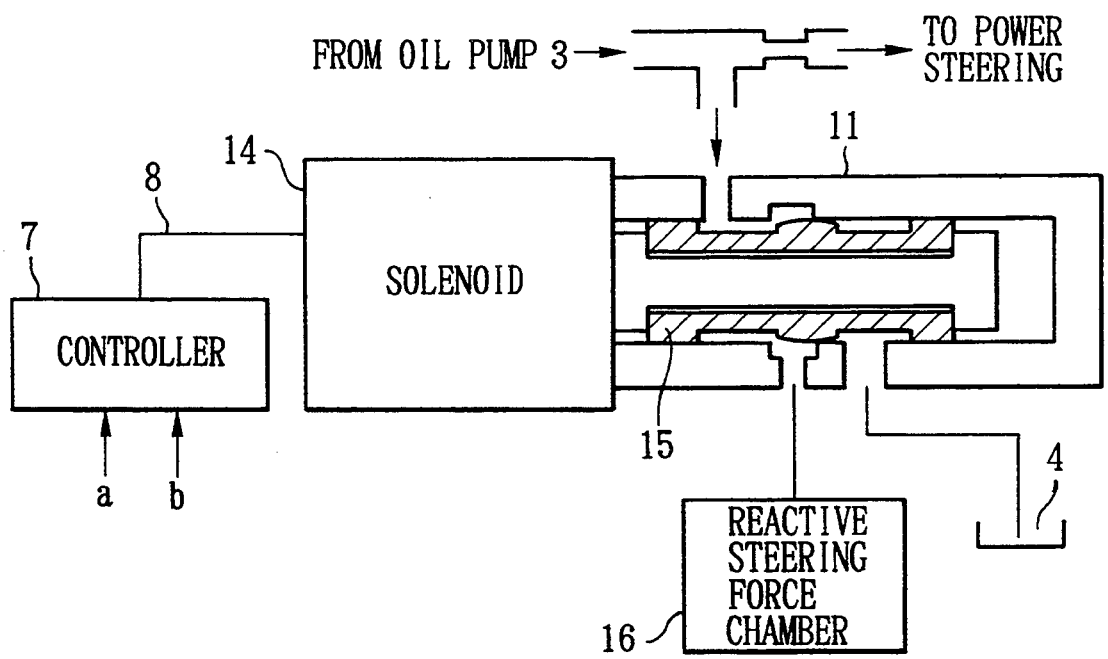
F I G. 3 (a)
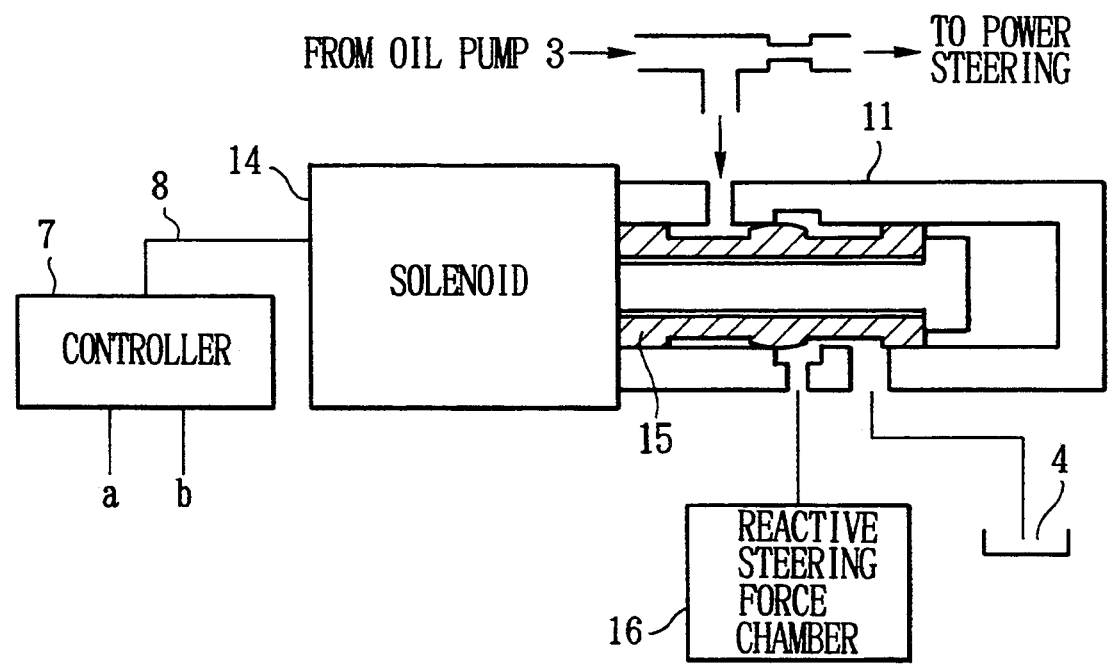
F I G. 3 (b)

METHOD OF DIAGNOSING POWER STEERING SYSTEM

This is a continuation of application Ser. No. 07/911,254 filed Jul. 7, 1992, now abandoned, which is a continuation of application Ser. No. 07/538,190 filed Jun. 14, 1990, now abandoned.

BACKGROUND OF THE INVENTION

The present invention relates to a method of diagnosing changes in steering force with respect to changes in vehicle velocity.

A generally used power steering system will be described first with reference to FIG. 2. Referring to FIG. 2, reference numeral 1 denotes an engine; 2, a vehicle velocity sensor; 3, an oil pump; 4, a tank; 5, outlet-side piping; 6, return-side piping; 7, a controller; 8, a current feeder line; 9, an ignition key; 10, a battery; 11, a solenoid valve; 12, a control valve of power steering; 13, a steering shaft; 17, an indicator lamp; and 18, power source backup wiring. Reference symbol SW1 denotes a diagnosis switch; and SW2, a steering force switch.

An operation of the power steering system will be described below. A normal operation will be described first. When the ignition key 9 is turned on to start the engine 1, the oil pump 3 is rotated by the engine 1 so as to supply an oil to the control valve 12 of power steering and the like as a pressurized oil. The supplied oil passes through the control valve 12, the solenoid valve 11, and the like and returns to the tank 4 through the return-side piping 6. The engine 1 and the vehicle velocity sensor 2 respectively output an engine speed signal a and a vehicle velocity signal b to the controller 7. Upon reception of the engine speed signal a and the vehicle velocity signal b, the controller 7 supplies a current corresponding to the signals a and b to a solenoid 14 so as to control a reactive pressure, thus generating a reactive steering force corresponding to a vehicle velocity.

FIGS. 3(a) and 3(b) show the solenoid valve 11 in detail. Referring to FIG. 3, reference numeral 14 denotes the solenoid connected to the current feeder line 8; 15, a spool to be driven by the solenoid in the lateral direction in FIG. 3; and 16, a reactive steering force chamber in the control valve 12 of power steering. FIG. 3(a) shows a state of the solenoid valve 11 during high-velocity travel of the vehicle. In this state, the spool 15 is in an "open" state, and a predetermined pressure is applied from the oil pump 3 to the reactive steering force chamber 16. This predetermined pressure is converted into a torque to generate a predetermined reactive steering force. FIG. 3(b) shows a state of the solenoid valve 11 during stationary turn (low-velocity travel) of the vehicle. In this state, the spool 15 is in a "closed" state, and the pressure of the reactive steering force chamber 16 is set to be equal to that of the tank 4. Hence, the reactive steering force becomes zero.

In delivery inspection, the above-described operation of the power steering system must be checked. FIG. 4 shows a conventional diagnosis sequence for this purpose. The ignition key 9 and the diagnosis switch SW1 (see FIG. 2) are turned on first (step 21). With this operation, the vehicle is kept in a self-diagnosis mode until the ignition key 9 is turned off. This diagnosis switch SW1 is arranged at a position where a user cannot operate and is normally kept OFF. While the diagnosis switch SW1 is OFF, the vehicle is set in a normal travel mode instead of the diagnosis mode indicated by the flow chart in FIG. 4.

The engine is started by a starter switch to perform an idling operation (step 22). Since the vehicle is stopped at this time, the solenoid 14 is driven by a current (about 0.95 A) corresponding to a vehicle velocity of 0 km/h. Subsequently, the solenoid 14 is kept driven by this current.

It is checked whether a vehicle velocity signal is proper, i.e., pulses are input from the vehicle velocity sensor 2 (step 24). If the signal is proper, a flag representing that the vehicle velocity signal is proper is set in an internal memory (step 25). Since the vehicle is not travelling immediately after the self-diagnosis mode is set, no pulses are input and hence no proper vehicle velocity signal is normally obtained. However, as will be described later, the sequence is repeatedly executed as indicated by step 35. Therefore, if the flow advances to step 24 after the vehicle starts to travel, since a predetermined number of pulses (e.g., seven pulses) or more pulses are held in a counter for counting a vehicle velocity signal, it is determined that the vehicle velocity signal is proper. If no pulses are counted after the vehicle starts to travel, it means failure of the vehicle velocity sensor 2, disconnection of the wiring through which the vehicle velocity signal b flows, or the like. In this case, no flag indicating the vehicle velocity signal is proper is set until self-diagnosis is completed. During a self-diagnosis operation, the vehicle is caused to travel only several meters. For this reason, the vehicle velocity is limited to about 10 to 20 km/h.

Subsequently, it is checked whether an engine speed signal is proper (e.g., 21 pulses or more) (step 26). If the signal is proper, a flag representing that the engine speed signal is proper is set (step 27). If the wiring through which the engine speed signal a flows is disconnected or the like, no flag is set. It is then checked whether the solenoid is properly operated (step 28). If YES in step 28, a flag representing that the solenoid is properly operated is set (step 29). If NO in step 28, current supply to the solenoid 14 is stopped (step 30). Whether the solenoid 14 is properly operated or not is determined by checking whether the driving current value set in step 23 is a preset value. While the vehicle is not travelling, for example, about 0.95 A is set as the preset value, A driving current may become larger than the preset value due to short circuit of the solenoid 14 or the like. In this case, current supply to the solenoid 14 must be immediately stopped.

It is checked whether a backup power source is proper (step 31). If YES in step 31, a flag representing that the backup power source is proper is set (step 32). This backup power source is supplied from the battery 10 through the wiring 18 in FIG. 2 and is used to back up a RAM (not shown) for storing the respective data during vehicle travel. It is then checked whether the steering force switch SW2 is properly operated (step 33). If YES in step 33, a flag representing that the switch SW2 is properly operated is set (step 34). It is determined that the switch SW2 is properly operated if, for example, one of sport and normal modes is selected once or more. The switch SW2 serves to select either a large steering force or a normal steering force. When the normal mode is selected, a normal steering force is required. When the sport mode is selected, a large steering force is required. Assume that the switch SW2 is set in the normal mode. In this case, if an operator switches the switch SW2 to the sport mode, this switched state is detected, and it is determined that the switch SW2 is properly operated.

It is checked whether the diagnosis switch SW1 is ON (step 35). The processing from step 24 to step 35 is repeated as long as the switch SW1 is ON.

After the diagnosis switch SW1 is turned off, the solenoid is stopped and a diagnosis result is output (steps 36 and 37). Whether the diagnosis result is proper or abnormal is determined by checking whether a flag is set in a corresponding internal memory. The display lamp 17 is turned on and off in accordance with the decision made on the diagnosis result or an object to be diagnosed.

In conventional diagnosis of the power steering system in the self-diagnosis mode, since a vehicle is caused to travel only several meters, the vehicle velocity cannot be increased much. For this reason, it is not possible to check changes in steering force with respect to changes in vehicle velocity in actual travel. Therefore, errors associated with changes in steering force cannot be detected.

In order to accurately diagnose changes in steering force with respect to changes in vehicle velocity, a vehicle must actually travel at considerably high speed. However, it is practically impossible to perform such an operation in delivery inspection.

SUMMARY OF THE INVENTION

The present invention has been made in consideration of such a situation, and has as its object to provide a method of diagnosing a power steering system, which allows diagnosis of changes in steering force with respect to changes in vehicle velocity in a self-diagnosis mode.

In order to achieve the above object, according to the present invention, there is provided a method of diagnosing a power steering system having a reactive steering force chamber for changing a steering force in accordance with changes in vehicle velocity, which is adopted to diagnosis changes in steering force with respect to the changes in vehicle velocity by using a self-diagnosis mode, wherein in the self-diagnosis mode, the changes in steering force are diagnosed by setting the pressure of the reactive steering force chamber in accordance with an engine speed.

In the method of diagnosing a power steering system according to the present invention, a solenoid valve driving current is controlled by an engine speed in the self-diagnosis mode.

BRIEF DESCRIPTION OF THE DRAWINGS

FIG. 3(a) and 3(b) are the views showing a detailed arrangement associated with a solenoid valve;

DESCRIPTION OF THE PREFERRED EMBODIMENT

Figure 1:
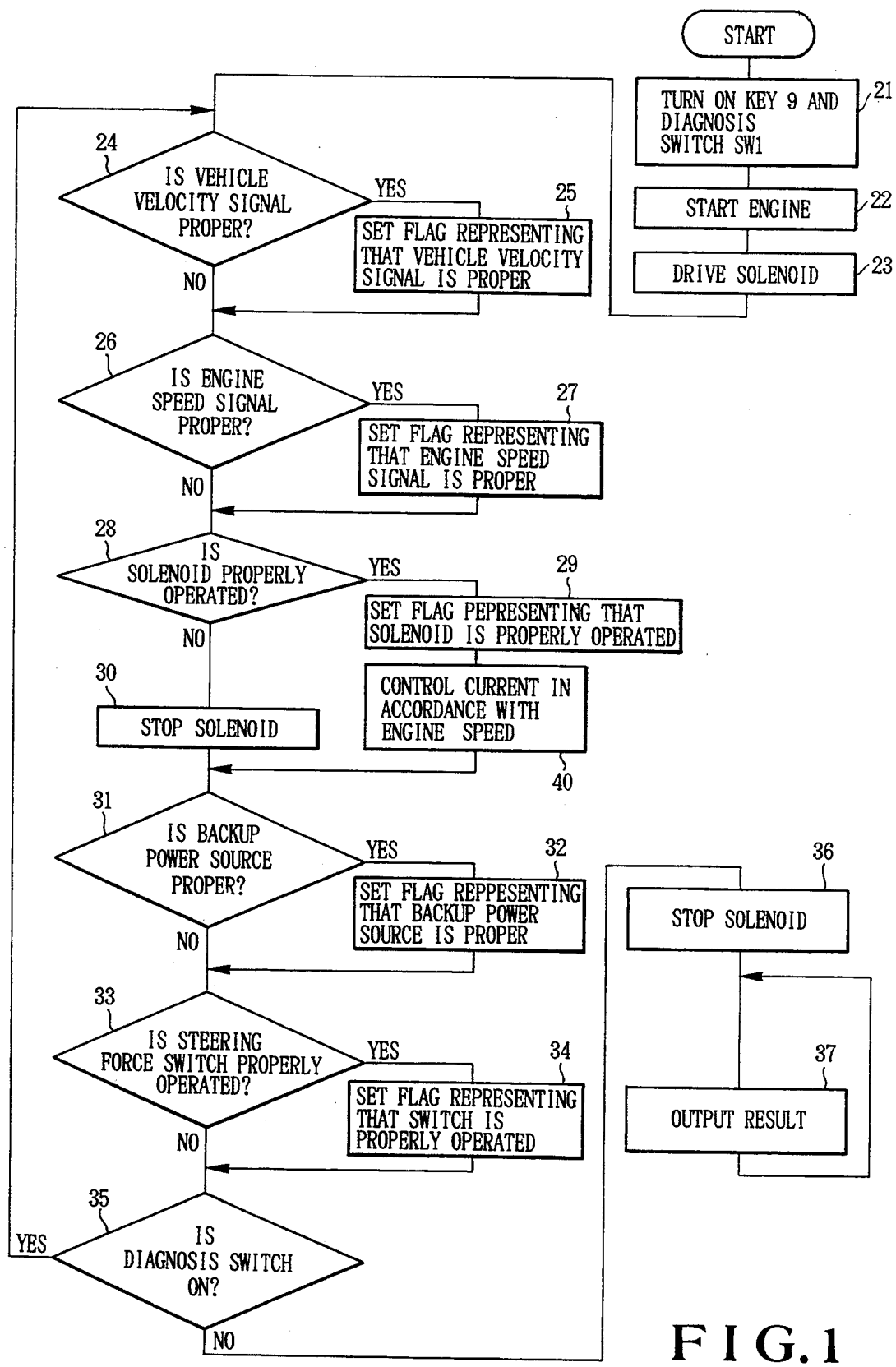
FIG. 1 is a flow chart for explaining a method of diagnosing a power steering system according to an embodiment of the present invention.
Figure 4:
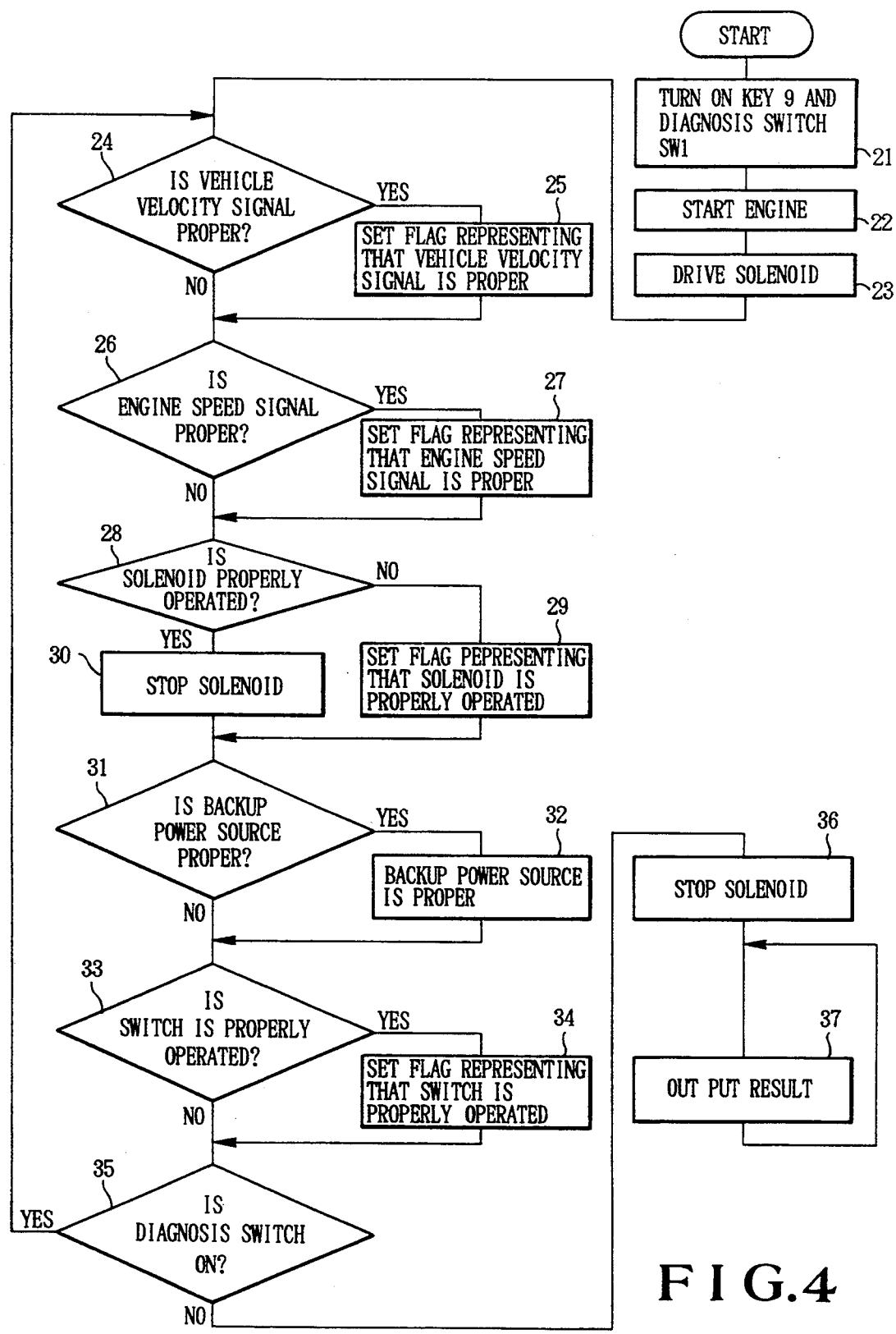
FIG. 4 is a flow chart for explaining a conventional method of diagnosing a power steering system.

A method of diagnosing a power steering system according to an embodiment of the present invention will be described below with reference to FIG. 1. Since the flow chart in FIG. 1 indicating this embodiment is different from that in FIG. 4 in only step 40, a description of steps other than step 40 will be omitted.

In a self-diagnosis mode, a vehicle travels only when a vehicle velocity signal is checked. In this case, the vehicle travels only several meters, and it is not possible to diagnose changes in steering force with respect to changes in vehicle velocity in actual travel. This embodiment, however, allows diagnosis of changes in steering force with respect to changes in vehicle velocity in actual travel even if the vehicle is stopped. Step 40 will be described next.

Figure 2:
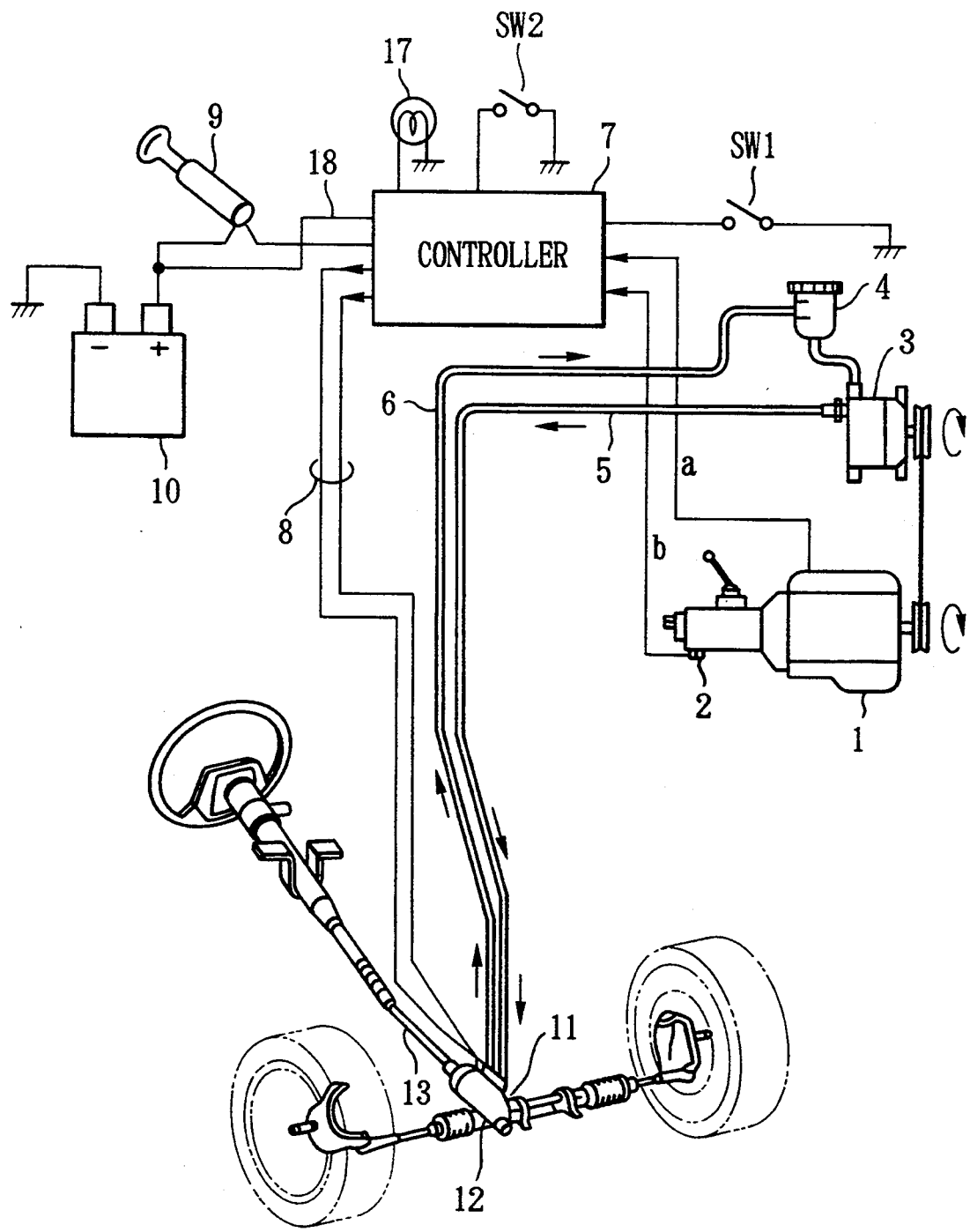
FIG. 2 is a view showing an arrangement of a generally used power steering system.
Figure 5:
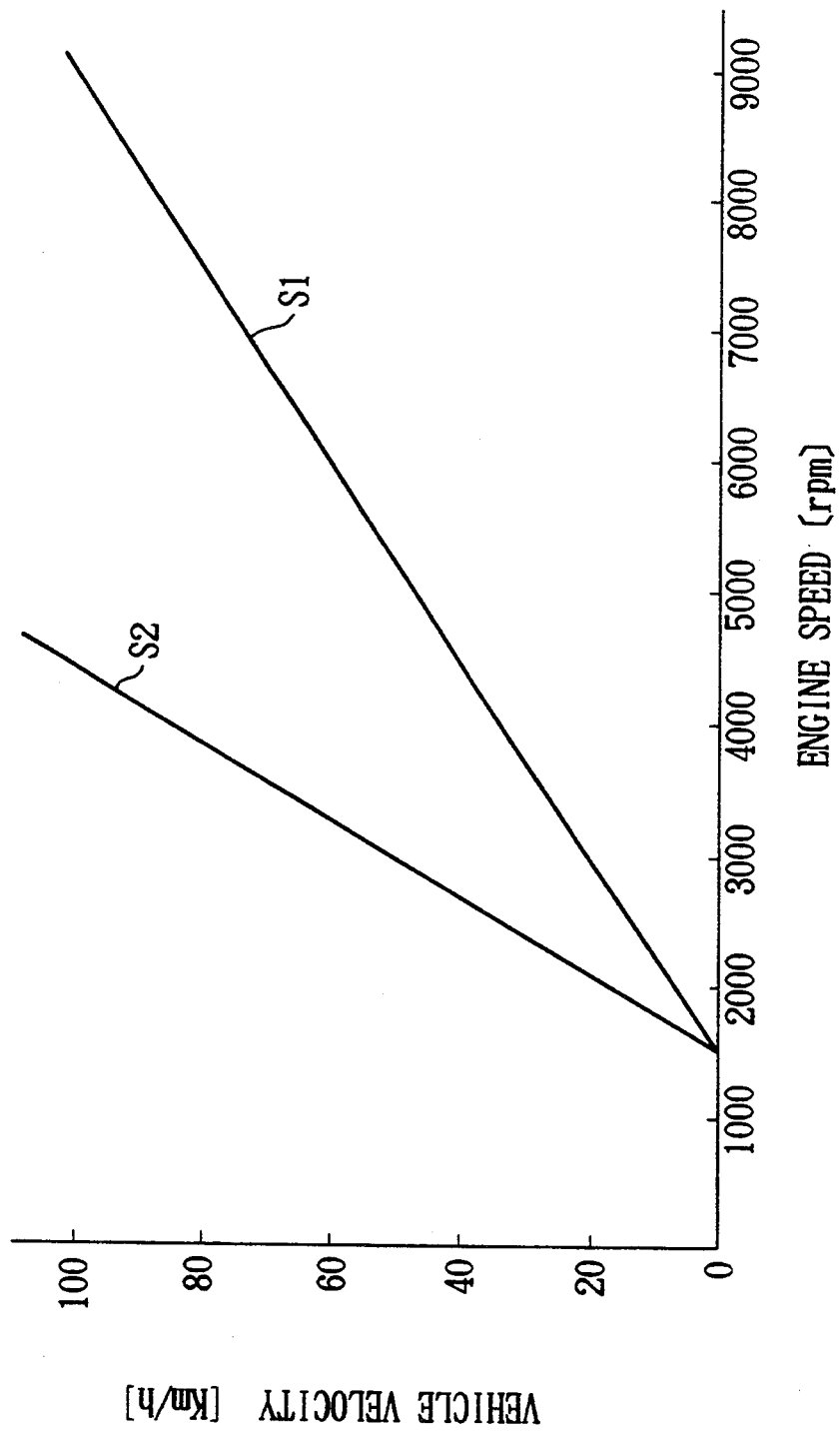
FIG. 5 is a graph showing a relationship between an engine speed and a vehicle velocity in a normal travel mode and a diagnosis mode (self-diagnosis mode).

In step 40, a driving current to be supplied to a solenoid valve 11 is controlled by an engine speed signal a (see FIGS. 2 and 3). The engine speed signal a is input to a controller 7. The controller 7 controls the driving current to the solenoid valve 11 in accordance with the signal a. As the signal a is increased in level, a current to be supplied to a solenoid 14 is reduced. That is, the pressure of a reactive steering force chamber 16 is controlled by the engine speed signal a. Therefore, by setting the value of the engine speed a to correspond to a vehicle velocity as shown in FIG. 5, steering force change characteristics with respect to changes in vehicle velocity in actual travel can be diagnosed. This allows easy diagnosis of changes in steering force with respect to changes in vehicle velocity in actual travel without actually causing the vehicle to travel.

This diagnosis is performed as follows. An operator depresses the accelerator pedal to increase the engine speed and set the vehicle in a high-velocity state. In this state, the steering wheel is operated to check whether a required steering force is increased or not.

FIG. 5 shows a relationship between an engine speed and a vehicle velocity. Reference symbols S1 and S2 respectively denote characteristics in the normal travel mode and in the self-diagnosis mode. If the engine speed is excessively increased in the self-diagnosis mode, large noise is produced. In addition, idling may adversely affect the engine. For this reason, the characteristics in the self-diagnosis mode are designed such that the vehicle velocity is quickly increased with an increase in engine speed, in order to allow diagnosis of steering force characteristics in high-velocity travel even with a low engine speed. For example, in order to obtain a vehicle velocity of 100 km/h, 9,000 rpm is required according to a characteristic curve S1, but only about 4,000 rpm is required according to a characteristic curve S2.

Since changes in steering force with respect to changes in vehicle velocity in actual travel can be diagnosed in the self-diagnosis mode in this manner, changes in required steering force can be observed in a stopping state of a vehicle during delivery inspection or the like. This allows detection of, e.g., a state wherein an oil pressure is not properly supplied to the reactive steering force chamber 16 due to clogging of the spool 15.

As has been described above, according to the present invention, the pressure of a reactive steering force chamber is set in accordance with an engine speed so as to diagnose changes in steering force. This allows diagnosis of changes in steering force with respect to changes in vehicle velocity in actual travel without actually causing a vehicle to travel.

What is claimed is:

1. A method for diagnosing a power steering system of a vehicle, the power steering system comprising a power steering pump coupled to an engine of the vehicle for causing a flow of oil from the pump to both a power steering shaft and a solenoid valve under control of a solenoid during rotation of the engine, the power steering system further comprising a controller for receiving as input an engine speed signal from the engine and a vehicle velocity signal from a vehicle velocity sensor coupled to the engine, the controller outputting a current to the solenoid for operating the solenoid valve to control a reactive pressure in a steering force chamber of a control valve coupled to the solenoid valve in response to the current supplied from the controller, the method comprising the steps of:

(a) turning a key switch of the vehicle to an ignition position to supply electric power to the engine;

(b) turning a diagnosis switch ON;

(c) turning the key switch of the vehicle to a starter position to start the engine;

(d) checking whether the engine speed signal input to the controller properly corresponds to an actual speed of rotation of the engine;

(e) checking whether the solenoid is operating properly in response to the current input to the solenoid from the controller; and (f) supplying the current from the controller to the solenoid having a magnitude corresponding to the engine speed signal to control the solenoid in accordance with the actual engine speed of the engine during diagnosis of the power steering system such that changes in the reactive pressure can be diagnosed without causing the vehicle to travel, wherein the current supplied from the controller to the solenoid has a magnitude which increase at a faster rate than a rate of change of the actual engine speed to permit diagnosis of the power steering system at low engine speeds.

2. A method for diagnosing a power steering system of a vehicle, the power steering system comprising a power steering pump coupled to an engine of the vehicle for causing a flow of oil from the pump to both a power steering shaft and a solenoid valve under control of a solenoid during rotation of the engine, the power steering system further comprising a controller for receiving as input an engine speed signal from the engine and a vehicle velocity signal from a vehicle velocity sensor coupled to the engine, the controller outputting a current to the solenoid for operating the solenoid valve to control a reactive pressure is a steering force chamber of a control valve coupled to the solenoid valve in response to the current supplied from the controller, the method comprising the steps of:

(a) turning a key switch of the vehicle to an ignition position to supply electric power to the engine;

(b) turning a diagnosis switch ON;

(c) turning the key switch of the vehicle to a starter position to start the engine;

(d) checking whether the engine speed signal input to the controller properly corresponds to an actual speed of rotation of the engine;

(e) checking whether the solenoid is operating properly in response to the current input to the solenoid from the controller; and (f) supplying the current from the controller to the solenoid having a magnitude corresponding to the engine speed signal, the magnitude of the current increasing at a faster rate than a rate of change of the actual engine speed to permit diagnosis of the power steering system at low engine speeds without causing the vehicle to travel.

3. A method for controlling a reactive pressure in a steering force chamber of a control valve of a power steering system of a vehicle during diagnosis of the power steering system, the control valve connected to an oil pump of the power steering system through a solenoid valve, the solenoid valve being under control of a solenoid for controlling the reactive pressure in the steering force chamber in response to a current supplied to the solenoid from a controller, the controller receiving as input an engine speed signal from the engine and a vehicle velocity signal from a vehicle velocity sensor coupled to the engine, the method comprising a step of:

supplying the current from the controller to the solenoid having a magnitude corresponding to the engine speed signal to control the reactive pressure of the steering force chamber in accordance with an actual engine speed of the engine during diagnosis of the power steering system such that changes in the reactive pressure can be diagnosed without causing the vehicle to travel, wherein the current supplied from the controller to the solenoid has a magnitude which increase at a faster rate than a rate of change of the actual engine speed to permit diagnosis of the power steering system at low engine speeds.

4. A method for controlling a reactive pressure in a steering force chamber of a control valve of a power steering system of a vehicle during diagnosis of the power steering system, the control valve connected to an oil pump of the power steering system through a solenoid valve, the solenoid valve being under control of a solenoid for controlling the reactive pressure in the steering force chamber in response to a current supplied to the solenoid from a controller, the controller receiving as input an engine speed signal from the engine and a vehicle velocity signal from a vehicle velocity sensor coupled to the engine, the method comprising a step of:

supplying the current from the controller to the solenoid having a magnitude corresponding to the engine speed signal, the magnitude of the current increasing at a faster rate than a rate of change of an actual engine speed to permit diagnosis of the power steering system at low engine speeds without causing the vehicle to travel.

* * * * *